United States Patent
Ebert et al.

(10) Patent No.: US 11,543,596 B2
(45) Date of Patent: Jan. 3, 2023

(54) FIBER HOLDER SYSTEM

(71) Applicant: PHYSIK INSTRUMENTE (PI) GMBH & CO. KG, Karlsruhe (DE)

(72) Inventors: Michael Ebert, Karlsruhe (DE); Antje Bogner, Straubenhardt (DE); Richard Montbrun, Pfinztal (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 115 days.

(21) Appl. No.: 16/651,306

(22) PCT Filed: Sep. 24, 2018

(86) PCT No.: PCT/DE2018/100804
§ 371 (c)(1),
(2) Date: Mar. 27, 2020

(87) PCT Pub. No.: WO2019/063041
PCT Pub. Date: Apr. 4, 2019

(65) Prior Publication Data
US 2020/0271865 A1      Aug. 27, 2020

(30) Foreign Application Priority Data
Sep. 27, 2017   (DE) .......................... 102017122385.1

(51) Int. Cl.
*G02B 6/36*      (2006.01)
*B25B 11/00*     (2006.01)
(Continued)

(52) U.S. Cl.
CPC .......... *G02B 6/3616* (2013.01); *B25B 11/002* (2013.01); *H02G 3/263* (2013.01); *H02G 3/32* (2013.01)

(58) Field of Classification Search
CPC .... G02B 6/3616; B25B 11/002; H02G 3/263; H02G 3/32
(Continued)

(56) References Cited

U.S. PATENT DOCUMENTS

| 4,687,289 A | 8/1987 | Desanti |
| 4,795,856 A * | 1/1989 | Farmer ................ G02B 6/4439 |
| | | 174/40 R |

(Continued)

FOREIGN PATENT DOCUMENTS

| DE | 19602636 A1 | 7/1997 |
| DE | 19827767 A1 | 1/1999 |

(Continued)

OTHER PUBLICATIONS

Translation of Office Action of the German Patent Office, dated Feb. 2, 2018 and Reply to Office Action with amended claims, dated Aug. 29, 2018, DE Application 10 2017 122 385.1, Filed Sep. 27, 2017 (6 pages).

(Continued)

*Primary Examiner* — Jerry M Blevins
(74) *Attorney, Agent, or Firm* — The Juhasz Law Firm

(57) ABSTRACT

The invention relates to a fiber holder system (1) comprising a base (2) provided for arrangement on a positioning device, the base (2) comprising at least three contact surfaces (3) arranged perpendicular to one another, and a fiber holder (4) with a arrangement section (5), an arm section (6) and a holding section (7), and a holding device (8) for arrangement of the fiber holder (4) on the base (2) with a defined force in a positionally stable and releasable manner, wherein the arrangement section (5) also comprises three mutually perpendicular arrangement surfaces (9), and wherein the holding device (8) comprises magnets or magnetic sections in order to use the corresponding magnetic forces to press the (Continued)

Figure 1:
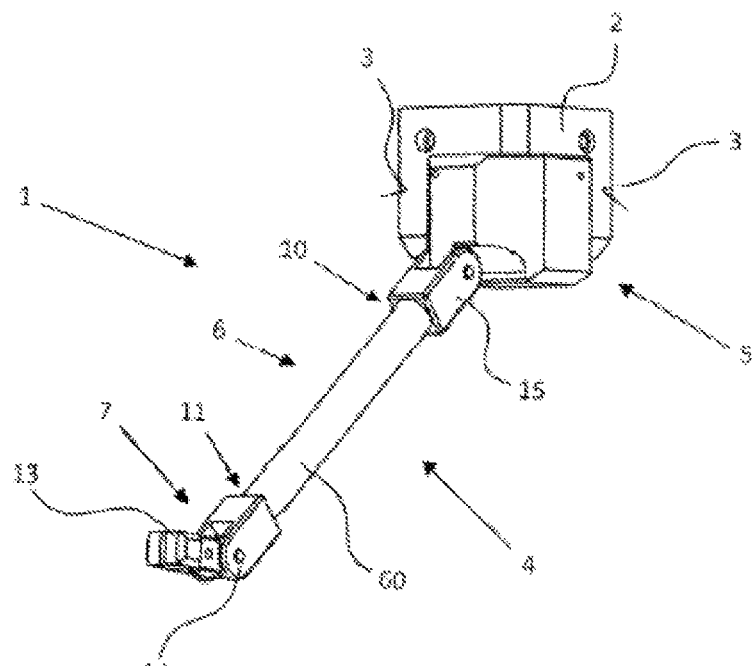

arrangement surfaces (9) against the contact surfaces (3) with a defined force and thereby to realize the positionally stable and releasable arrangement of the fiber holder (4) on the base (2), and wherein a distal end (10) of the arm portion (6) is connected to the abutment portion (5) and wherein at the other distal end (11) of the arm portion (6) the holding section (7) for holding a fiber is disposed. Furthermore, the invention relates to the use of the aforementioned fiber holder system (1) in a fiber alignment device.

18 Claims, 3 Drawing Sheets

(51) Int. Cl.
    *H02G 3/00*     (2006.01)
    *H02G 3/32*     (2006.01)

(58) Field of Classification Search
    USPC .......................................................... 385/137
    See application file for complete search history.

(56) References Cited

U.S. PATENT DOCUMENTS

| | | |
|---|---|---|
| 5,044,721 A | 9/1991 | Nakamura |
| 5,933,287 A | 8/1999 | Muller |
| 6,002,827 A | 12/1999 | Ekwall |
| 9,188,839 B2 | 11/2015 | Rodriguez et al. |
| 9,369,208 B2 | 6/2016 | Chou et al. |
| 2003/0174419 A1 | 9/2003 | Kindler |
| 2006/0104588 A1* | 5/2006 | Cox ..................... G02B 6/3855 385/136 |
| 2006/0285801 A1 | 12/2006 | Aoki |
| 2009/0148121 A1 | 6/2009 | Meitzler |
| 2011/0313683 A1* | 12/2011 | Chen ..................... G01M 11/088 356/73.1 |
| 2014/0306071 A1 | 10/2014 | Stechmann |
| 2016/0056620 A1* | 2/2016 | Weigl ..................... H02G 5/025 174/70 R |
| 2016/0149386 A1* | 5/2016 | Stechmann ............... F16B 1/00 248/68.1 |

FOREIGN PATENT DOCUMENTS

| | | |
|---|---|---|
| DE | 69835257 T2 | 11/2006 |
| DE | 102013219278 A1 | 4/2014 |
| EP | 1193402 A1 | 4/2002 |
| KR | 10 20140047421 A | 4/2014 |
| WO | 2007050537 A2 | 5/2007 |
| WO | 2010050981 A1 | 5/2010 |

OTHER PUBLICATIONS

International Search Report, PCT/DE2018/100804, dated Dec. 7, 2018, 3 pages (in English).
Written Opinion of the International Searching Authority, PCT/DE2018/100804, dated Dec. 7, 2018, 6 pages (in English).

* cited by examiner

FIBER HOLDER SYSTEM

The invention relates to a fiber holder system according to claims 1 to 7 and the use of such a fiber holder system in a fiber alignment device according to claim 8.

It is known from the general prior art to use a fiber holder system for positioning or aligning, for example, optical fibers, in which the fiber to be positioned is held via a fiber holder attached to a base, the base being provided for arrangement on a positioning device. The fiber holder is usually attached to the base using a screw connection.

However, the aforementioned fiber holder systems known from the prior art are disadvantageous. The realization of a screw connection between the fiber holder and the base takes a comparatively long time, which is particularly annoying when the fiber holder is changed frequently. In addition, the said screw arrangement harbors the risk that loosened or screws to be screwed can fall down and, as a result, optical or electronic components or components located underneath are damaged. The lack of resilience of a screw connection can also be disadvantageous, particularly in those applications in which highly sensible and sensitive components are located in the immediate vicinity of the fiber holder moved for the positioning or alignment of the fiber.

Fiber holders with detachable connections in the form of magnetic holders are generally known in the relevant specialist circles. The publications US20060285801 A1, U.S. Pat. Nos. 5,044,721 A, 4,687,289 A and DE69835257 T2 each relate to fixing the fiber by means of magnetic forces, the fiber being in direct contact with the bodies held together by magnetic force or being clamped between them.

The publications US20090 148121 A1, WO2010050981 A1, U.S. Pat. No. 9,369,208 B2 and US20030174419 A1, which are more pertinent to the present invention, concern a magnetic holder of the fiber holder itself. A defined position or orientation of the fiber holder at another body is achieved here by means of fitting elements, for example fitting pins, fitting rings or spherical fitting elements, i.e. realized by engaging or penetrating elements.

The object of the invention is to provide a fiber holder system in which there is a reliable and quickly realizable or detachable connection of the fiber holder to a base, and which at the same time has a defined flexibility with regard to the connection between the fiber holder and the base.

This object is achieved by a fiber holder system according to claim 1, the subsequent sub-claims describing at least expedient further developments.

The term 'essentially' used in the following part of the description in connection with the specification of geometric data such as angles, dimensions, positions, orientations or directions is to be understood in such a way that the corresponding geometric data may have a deviation of +/−5% from the given geometric date, wherein this deviation is due, for example, to manufacturing or assembly tolerances.

The fiber holder system according to the invention comprises a base, a fiber holder and a holding device. The base is provided for arrangement on a positioning device so that the base and thus the fiber holder can be moved or positioned via the positioning device. The base comprises at least three contact surfaces, wherein three abutting and adjacent contact surfaces are arranged perpendicular to one another. It is conceivable that the base is designed as an integral part of the positioning device.

The fiber holder comprises a arrangement section, an arm section and a holding section, wherein the arrangement section comprises three arrangement surfaces which are arranged perpendicular to each other and which are provided for arrangement at the corresponding three contact surfaces of the base which are arranged mutually perpendicular to each other.

The holding device comprises magnets or magnetic sections in order to press or press the three arrangement surfaces of the arrangement section against the corresponding contact surfaces of the base with a defined force for arrangement of the fiber holder on the base, using the corresponding magnetic forces, wherein the contact surfaces and the arrangement surfaces contact each other at least in a section, which results in a position-stable arrangement of the fiber holder on the base that can be released with a defined force. Both the contact surfaces and the arrangement surfaces are preferably planar or essentially planar or even surfaces, so that under the action of the magnetic forces of the holding device a full-surface or essentially full-surface contact between the respective two assigned surfaces is realized.

When viewed from the center of the arm section, one of its two distal ends is connected to the arrangement section, while the holding section for holding a fiber is disposed at the other and opposite distal end of the arm section.

Due to the magnetic coupling or connectivity between the base and the fiber holder by means of the holding device, a very simple, quick and easily detachable arrangement of the fiber holder at the base is achieved, and thus a simple and quick possibility of exchanging or changing the fiber holder. At the same time, through a suitable choice of the magnets or the magnetic sections of the holding device, a defined force for detaching or yielding, for example through pivoting or tilting or twisting, of the fiber holder results in the event that the fiber holder counteracts during the positioning or alignment of the fiber a component to be protected against damage.

The presence of at least three mutually perpendicular contact surfaces on the base and, correspondingly, three mutually perpendicular arrangement surfaces on the arrangement section of the fiber holder also makes it possible in a particularly simple manner to arrange the fiber holder on the base in a positionally defined and reproducible manner with high accuracy. At the same time, the magnetic forces of the holding device can be realized by a maximum of three surface pairs, whereby a particularly high holding force or an optimized adaptation of the magnetic forces to the requirement profile of the respective application is possible.

It may be advantageous that the base alone or the arrangement section alone or both the base and the arrangement section comprises or comprise at least one permanent magnet or at least one section with permanent magnetic properties. By the use of permanent magnets a realization of the magnetic properties of the holding device can be easily achieved. It is sufficient that either only the base or only the arrangement section comprises a permanent magnet and the corresponding counterpart (i.e. arrangement section or the base) consists of a magnetizable material or comprises a magnetizable section. The magnets used are arranged on the base and/or the arrangement section and are preferably embedded therein. However, it is also conceivable to implement the required magnetic properties using electromagnets.

Furthermore, it can be advantageous that the arm section is movably connected to the arrangement section, so that movements, in particular pivoting movements, of the arm section relative to the arrangement section are possible. This allows the fiber position to be changed in a simple manner with respect to the arrangement section or the base and thus with respect to the positioning device.

It can also be advantageous that the arm section is variable in length. This enables the fiber holder to be easily adapted to different geometric conditions with regard to the position or orientation of a fiber.

It may also be advantageous that the arm section comprises a fiber-reinforced plastic. The arm section is preferably formed from a tube made from a fiber-reinforced plastic, in particular from a CFRP material. As a result, a realization of the fiber holder is achieved which is very light in weight and at the same time stiff and stable, so that an increased movement frequency or dynamics of the positioning device is possible.

In addition, it can be advantageous for the holding section to comprise a fiber clamping element which is arranged on the arm section such that it can move in relation to the arm section. Wth the fiber clamping element, the fiber can be held in a defined manner in a simple manner, and the optimized arrangement of the fiber is facilitated by the movable arrangement.

Furthermore, it can be advantageous for the holding section to comprise an joint fork which is fixedly connected to the arm portion, wherein the fiber clamping element is held rotatably relative to the joint fork in the same. The pivotable arrangement of the fiber clamping element with respect to the joint fork further improves the possibility of optimizing the alignment of the fiber.

The invention also relates to the use of a previously described fiber holder system in a fiber alignment device, which is often referred to in the English-speaking world as a fiber alignment device. Such fiber alignment devices are preferably used in the silicon photonics technology area, which is concerned with silicon-based circuits with data exchange via photons.

In the following an embodiment of the invention is described with reference to the accompanying figures.

The figures show:

FIG. 1: An embodiment of a fiber holder system according to the invention in a perspective view FIG. 2: Embodiment of the fiber holder system according to the invention according to FIG. 1 in a different perspective view FIG. 3: Representation of the fiber holder of the fiber holder system according to the invention according to FIGS. 1 and 2 in a perspective view FIG. 4: Front view of the fiber holder according to FIG. 3

Figure 3:
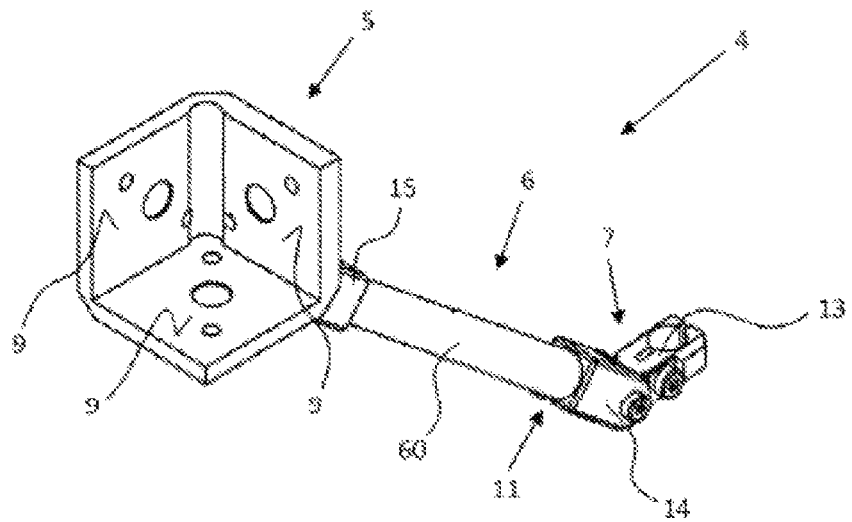
Figure 5:
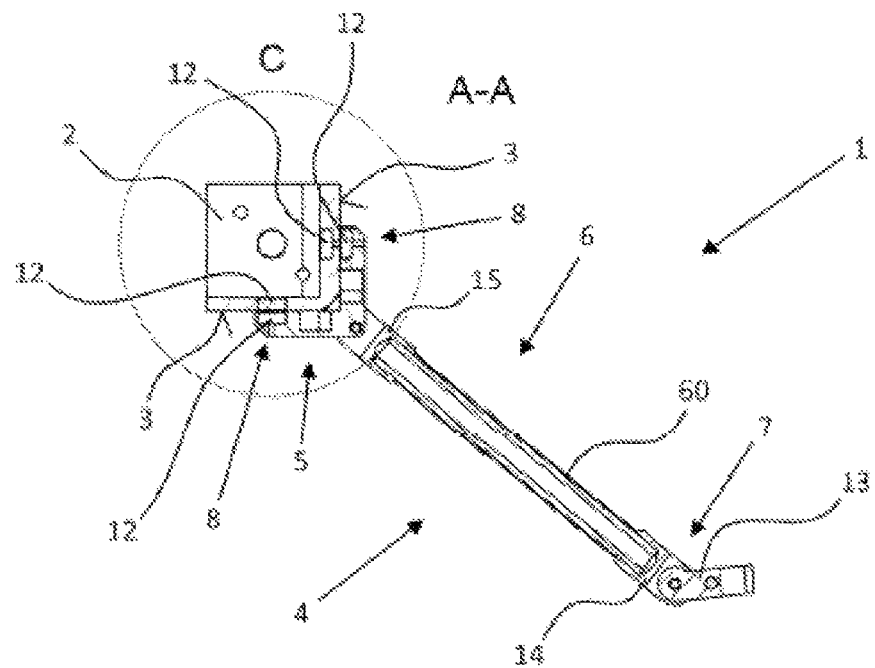

FIG. 5: Sectional view of the fiber holder along the section along A-A as shown in FIG. 3

Figure 6:
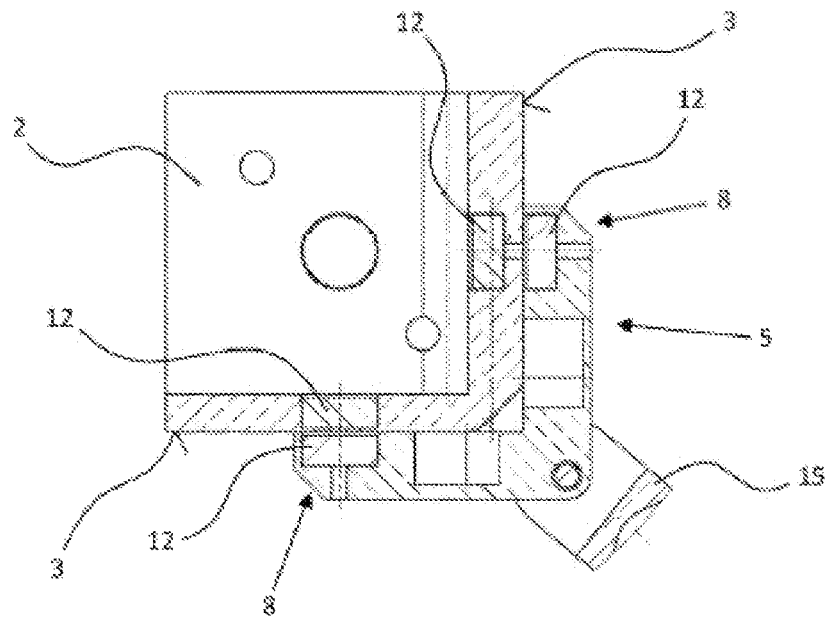

FIG. 6: Detail of the sectional view of FIG. 5

FIG. 1 shows a possible embodiment for the fiber holder system according to the invention in a perspective view. The fiber holding system 1 comprises a base 2 made of an aluminum material with three planar contact surfaces 3 each arranged perpendicular to one another, wherein the contact surfaces 3 each meet one another perpendicularly and are connected to one another via a section comprising a chamfer. The base 2 is provided for arrangement on a positioning device (not shown in FIG. 1).

The fiber holder system according to FIG. 1 furthermore comprises a fiber holder 4, in case the same is arranged at the base 2, which comprises an arrangement section 5, an arm section 6 and a holding section 7. The arrangement section 5, which also consists of an aluminum material, has a shape which is complementary to the shape of the base 2, which corresponds to a partial cube shape, and (not shown in FIG. 1) comprises three arrangement surfaces 9 which are each arranged perpendicular to one another and which are planar, wherein the arrangement surfaces 9 are provided for abutment or for contact with the corresponding contact surfaces 3 of the base 2. Due to the three mutually perpendicular contact surfaces 3 of the base and the arrangement surfaces 9 of the arrangement section 5 which are disposed in a complementary manner, an arrangement of the fiber holder 4 at the base 2 can be achieved which is defined and reproduceable with respect to the three mutually perpendicular spatial directions in a simple manner.

The base 2 comprises magnetic properties on each of its three contact surfaces 3, which in the present exemplary embodiment are realized by permanent magnets, which, not shown in FIG. 1, are embedded in the base and.

Likewise, the arrangement section 5 of the fiber holder 4 has magnetic properties on each of its three arrangement surfaces 9, wherein the magnetic properties of the contact surfaces 3 and the magnetic properties of the arrangement surfaces 9 complement one another in such a way that a greatest possible force for holding the fiber holder 4 or the arrangement section 5 at base 2 results.

By using an aluminum material for both the base 2 and the arrangement section 5, the weight of the fiber holder system 1 can be kept very low overall, which favors high movement or positioning speeds of the fiber holder system. Since aluminum has no permanent magnetic properties, permanent magnets are arranged or embedded in the base and in the arrangement section in order to realize the magnetic forces. However, it is also conceivable that only the base 2 or only the arrangement section 5 consists of an aluminum material with permanent magnets arranged thereon or embedded therein, and that the corresponding other part, i.e. either the arrangement section 5 or the base 2 consists of a magnetizable material, such as steel or a magnetizable steel alloy. This creates a fiber holder system that is easier to implement.

It is also conceivable that electromagnets are used which are disposed on the base and/or the arrangement section are used for realization of the magnetic forces for the defined holding of the fiber holder at the base.

In contrast to the embodiment of the fiber holder system shown in FIG. 1, it is also possible that the base 2 comprises only one contact surface 3 or only two contact surfaces 3, and the arrangement section 5 in a corresponding manner comprises only one arrangement surface 9 or only two arrangement surfaces 9. In these cases, however, a centering device is advantageous or necessary for the defined and reproducible positional arrangement of the fiber holder 4 at the base 2, for example by using one or more pins on a contact surface 3 or on an arrangement surface 9, which, in case that the fiber holder is disposed at the base engage in a corresponding recess or recesses on the respectively assigned surface.

The arm section 6 consists of a tube 60 made of CFRP material and is movably connected to the arrangement section 5 via an joint fork 15. Here, the joint fork 15 is fastened to a first distal end 10 of the arm section 6, for example by means of a screw connection or an adhesive connection. By means of the joint fork 15, the arm section 6 can be pivoted one-dimensionally with respect to the arrangement section 5 or with respect to the base 2. Instead of an joint fork 15, it is conceivable to choose a connecting element which allows multidimensional pivoting movements of the arm section 6 or, moreover, also rotational movements about the longitudinal axis of the arm section 6, for example in the form of a cardan or ball joint.

An joint fork 14 is also attached to the other distal end 11 of the arm section 6 which lies contrary to the distal end 10, wherein a fiber clamping element 13 is movably arranged within the joint fork 14 for the clamping reception of a fiber, preferably an optical fiber. The joint fork 14 allows the fiber clamping element 12 to be pivoted one-dimensionally with respect to the arm section 6. Here, too, it is conceivable to use a cardan joint or a ball joint with several degrees of freedom of movement instead of an joint fork with one degree of freedom of movement.

The combination of the movable arrangement of the arm section 6 on the arrangement section 5 with the movable arrangement of the fiber clamping element 13 on the arm section 6 enables a variety of adjustment options for an optimized alignment of a fiber held by the fiber clamping element 13 with respect to the base 2 or the positioning device.

Figure 2:
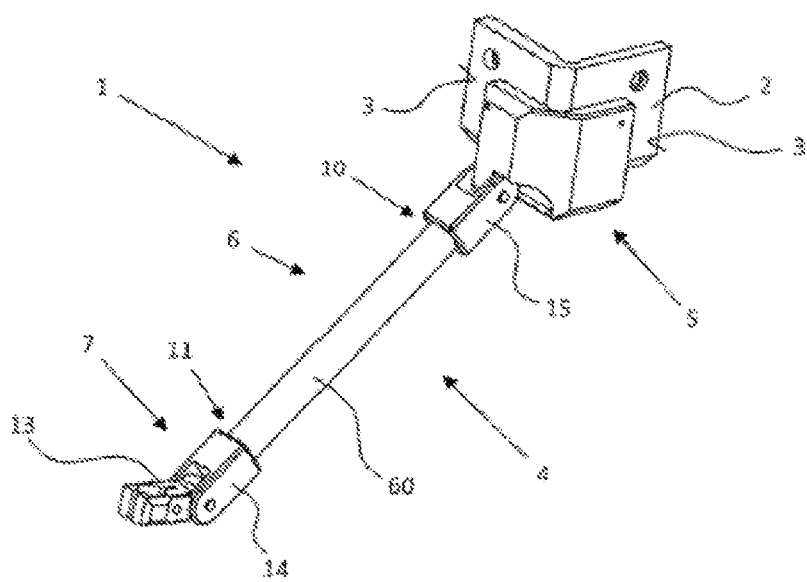

FIG. 2 shows the embodiment of the fiber holder system according to the invention according to FIG. 1 in another perspective view. From this, the construction or structure of the base 2 and the arrangement section 5 with the three surfaces arranged perpendicular to one another and their arrangement with respect to one another can be seen more clearly.

FIG. 3 shows a perspective view of the fiber holder 4 of the fiber holder system according to the invention corresponding to FIGS. 1 and 2. In this representation, the three planar arrangement surfaces 9 of the arrangement section 5, which in each case extend perpendicular to one another, can be clearly seen. It can also be seen from FIG. 3 that the joint fork 14 is connected to the CFRP tube 60 via a screw connection. In addition, a screw provided on the fiber clamping element 13 allows a fiber arranged in the fiber clamping element 13 to be clamped.

Figure 4:
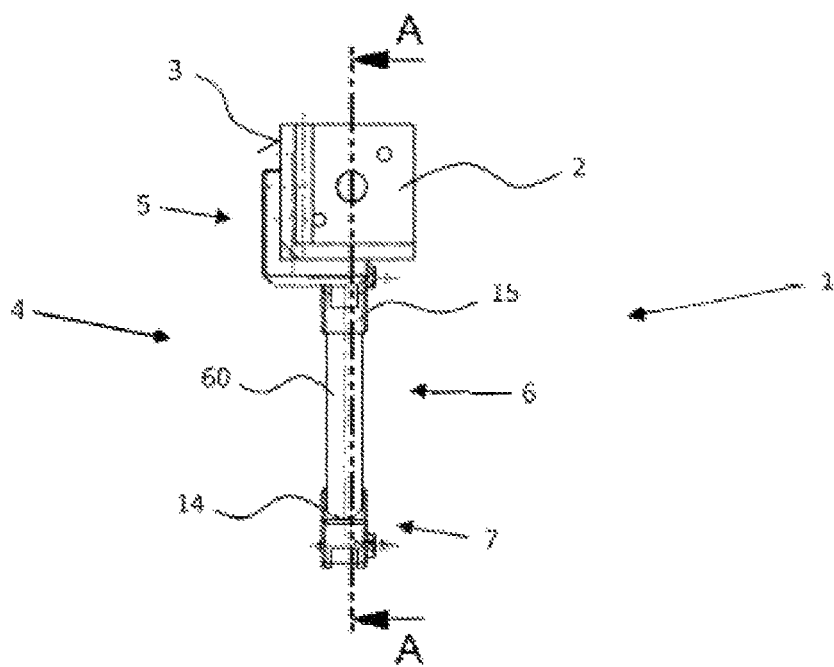

FIG. 4 shows the fiber holder according to FIG. 3 in a front view, wherein the sectional view along the section line A-A shown in FIG. 4 is shown in FIG. 5. FIG. 4 additionally shows in comparison with FIG. 3 that the joint fork 15 is also connected to the CFRP tube 60 of the arm section 6 by means of a screw connection.

FIG. 5 shows the sectional view according to the section along A-A drawn in FIG. 4 with respect to the fiber holder 4, while FIG. 6 shows the corresponding detail C of FIG. 5. The holding device 8 of the fiber holding system, which comprises a multiplicity of permanent magnets 12, can be seen on the basis of the sectional view in FIG. 5 or FIG. 6. Here, for each assigned pair of an arrangement surface 9 and a contact surface 3, a permanent magnet 12 embedded in the arrangement section 5 interacts with a permanent magnet 12 embedded in the base 2, wherein the arrangement of these components is just in such a manner that, when the arrangement section 5 is complementarily arranged at the base 2, an attractive, preferably a maximum attractive force of the permanent magnets 12 results. Corresponding permanent magnets are also arranged on the third pair of an arrangement surface 9 and a contact surface 3, which third pair is not shown in FIG. 5, or are embedded in the corresponding part of the arrangement section and in the corresponding section of the base.

LIST OF REFERENCE NUMERALS 1 fiber holder system
2 base
3 contact surface (of the base 2)
4 fiber holders
5 arrangement section (of the fiber holder 4)
6 arm section (of the fiber holder 4)
7 holding section (of the fiber holder 4)
8 holding device
9 arrangement surface (of the plant section 5)
10 distal end of the arm section 6
11 distal end of the arm section 6
12 permanent magnet
13 fiber clamping element (of the holding section 7)
14 joint fork (of the holding section 7)
15 joint fork
60 tube made of CFRP material

The invention claimed is:

1. A fiber holder system, comprising:
a base configured for arrangement on a positioning device, wherein the base comprises at least three contact surfaces, the three contact surfaces being arranged perpendicular to each other and facing outwardly from the base and defining three vertices where the three contact surfaces adjoin;
a fiber holder comprising an arrangement section, an arm section, and a holding section; and
a holding mechanism for attaching the fiber holder to the base with a defined force in a positionally stable and releasable manner;
wherein the arrangement section comprises at least three arrangement surfaces arranged perpendicular to each other and facing inwardly, the three arrangement surfaces defining three vertices where the arrangement surfaces adjoin and the holding mechanism comprises magnets or magnetic sections configured to magnetically connect by the three contact surfaces of the base arranged perpendicular to each other,
wherein a distal end of the arm section is connected to the arrangement section and the holding section for holding a fiber is arranged at the other distal end of the arm section.

2. The fiber holder system according to claim 1, wherein the base, or the arrangement section, or the base and the arrangement section comprise at least one permanent magnet or at least one section with permanent magnetic properties.

3. The fiber holder system according to claim 2, wherein the arm section is movably connected to the arrangement section, such that movements of the arm section relative to the arrangement section are possible.

4. The fiber holder system according to claim 3, wherein the movements of the arm section relative to the arrangement section comprise pivoting movements.

5. The fiber holder system according to claim 2, wherein the arm section is variable in length.

6. The fiber holder system according to claim 2, wherein the arm section comprises a fiber-reinforced plastic.

7. The fiber holder system according to claim 2, wherein the holding section comprises a fiber clamping element which is arranged on the arm section so that it can move.

8. The fiber holder system according to claim 7, wherein the holding section comprises a joint fork which is fixedly connected to the arm section, and wherein the fiber clamping element is held in the joint fork rotatably in relation to the joint fork.

9. A fiber alignment device comprising the fiber holder system according to claim 2.

10. The fiber holder system according to claim 1, wherein the arm section is movably connected to the arrangement section, such that movements of the arm section relative to the arrangement section are possible.

11. The fiber holder system according to claim 10, wherein the movements of the arm section relative to the arrangement section comprise pivoting movements.

12. The fiber holder system according to claim 1, wherein the arm section is variable in length.

13. The fiber holder system according to claim 1, wherein the arm section comprises a fiber-reinforced plastic.

14. The fiber holder system according to claim 1, wherein the holding section comprises a fiber clamping element which is arranged on the arm section so that it can move.

15. The fiber holder system according to claim 14, wherein the holding section comprises a joint fork which is fixedly connected to the arm section, and wherein the fiber clamping element is held in the joint fork rotatably in relation to the joint fork.

16. A fiber alignment device comprising the fiber holder system according to claim 1.

17. A fiber holder system, comprising:
- a base configured for arrangement on a positioning device, wherein the base comprises at least three contact surfaces, and adjacent contact surfaces which are arranged perpendicular to one another and which meet each other;
- a fiber holder with an arrangement section, an arm section, and a holding section; and
- a holding device for arrangement of the fiber holder on the base with a defined force in a positionally stable and releasable manner;
- wherein the arrangement section comprises at least three mutually perpendicular arrangement surfaces, and the holding device comprises magnets or magnetic sections configured to, by utilizing corresponding magnetic forces, contact at least sections of three mutually perpendicular contact surfaces of the base with the corresponding arrangement surfaces of the arrangement section of the fiber holder and press the arrangement surfaces with a defined force against the contact surfaces,
- wherein a distal end of the arm section is connected to the arrangement section and the holding section for holding a fiber is arranged at the other distal end of the arm section;
- wherein the arm section comprises a fiber-reinforced plastic;
- wherein the holding section comprises a fiber clamping element which is arranged on the arm section so that it can move; and
- wherein the holding section comprises a joint fork which is fixedly connected to the arm section, and wherein the fiber clamping element is held in the joint fork rotatably in relation to the joint fork.

18. A fiber holder system, comprising:
- a base configured for arrangement on a positioning device, wherein the base comprises at least three contact surfaces, and adjacent contact surfaces which are arranged perpendicular to one another and which meet each other;
- a fiber holder with an arrangement section, an arm section, and a holding section; and
- a holding device for arrangement of the fiber holder on the base with a defined force in a positionally stable and releasable manner;
- wherein the arrangement section comprises at least three mutually perpendicular arrangement surfaces, and the holding device comprises magnets or magnetic sections configured to, by utilizing corresponding magnetic forces, contact at least sections of three mutually perpendicular contact surfaces of the base with the corresponding arrangement surfaces of the arrangement section of the fiber holder and press the arrangement surfaces with a defined force against the contact surfaces,
- wherein a distal end of the arm section is connected to the arrangement section and the holding section for holding a fiber is arranged at the other distal end of the arm section;
- wherein the holding section comprises a fiber clamping element which is arranged on the arm section so that it can move; and
- wherein the holding section comprises a joint fork which is fixedly connected to the arm section, and wherein the fiber clamping element is held in the joint fork rotatably in relation to the joint fork.

* * * * *